United States Patent Office 3,263,546
Patented August 2, 1966

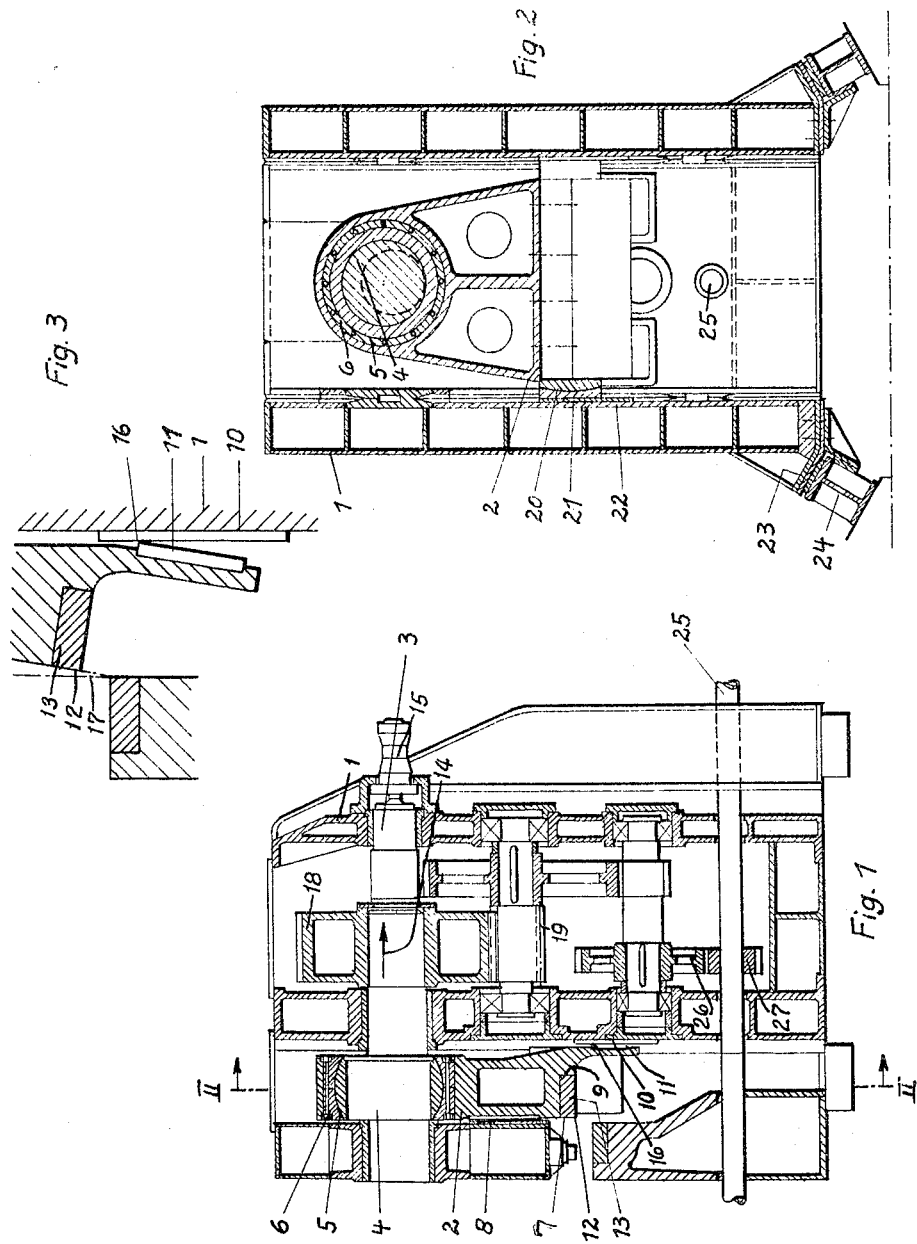

3,263,546
SHEARS FOR TRIMMING THICK AND
MEDIUM METAL PLATES
Hans Musly, Dusseldorf, and Willi Benz, Neuss (Rhine),
Germany, assignors to Schloemann Aktiengesellschaft,
Dusseldorf, Germany
Filed Feb. 14, 1964, Ser. No. 344,855
Claims priority, application Germany, Mar. 18, 1963,
Sch 32,960
10 Claims. (Cl. 83—556)

For trimming the edges of thick metal plates and of medium plates or sheets, shears with one stationary blade and one movable blade are in a known manner installed. In general the lower blade is stationary, and the upper blade is so arranged as to be movable by way of a crank gear. In order that during the return stroke of the upper blade its surface facing the cut surface of the plate may not be exposed to any frictional wear on the cut face of the plate, it is known to bring the upper blade, after the cut has been completed, and during the return stroke, out of the cutting plane. This can be effected in a known manner by rockably pivoting the upper blade, together with its blade-holder, about an axis arranged above the blade-holder guides. This presupposes that the guides facing the back of the blade must also be swung round on the shear stand, or must be so arranged as to be displaceable parallel to the requisite distance. In order to obviate these movable guides of the upper blade, together with its blade-holder, it has already been proposed to construct the shears as pendulum shears, so that after a cut has been completed, the members participating in the cut, that is, the upper and lower blades together, are brought out of reach of the cut edge of the plate, preferably by means of a power piston.

The object of this invention is to simplify the construction of such shears (which are intended more particularly for trimming the edges of boiler plates and of medium plates or sheets) and of the blades that effect the cutting, by deflecting them out of the region of the cutting plane. According to the invention this is effected by virtue of the feature that the axis of oscillation of the blade-holder for the blade that executes the cut, preferably the upper blade, extends parallel to the cutting edge of the movable blade, and is located below or on a level with the cutting edge of the movable blade. By locating the axis of oscillation below the cutting edge, or preferably at the height of the same, the springing pressure acting upon the breast of the blade is reliably taken up, and the elements required for the tilting of the blade-holder can be arranged outside the cutting range of the shears. The guides for the blade-holder may advantageously be arranged stationarily on the stand, the blade-holder guides that face the back of the blade being arranged below the cutting edge of the movable blade, and at best being brought right up to the level of the cutting edge. The upper edge of the guides advantageously forms the axis of oscillation of the blade-holder. The tilting movement of the blade-holder about its axis of oscillation is effected by axial displacement of its driving shaft, which is guided in it.

In a further development of the invention the blade-holder is actuated, for the execution of the cutting and return strokes, by an eccentric shaft, and has two guiding surfaces which extend perpendicularly to the plane of cutting, and which have a convex curvature in the region of the blade. The blade thereby executes a rocking cut, as is preferred for the trimming of thick and medium plates.

The bearing surface between the blade-holder and the eccentric shaft is in the shape of a segment of a sphere, as a result of which the pivotal connection required for the tilting of the blade-holder, between the latter and the axially displaceable eccentric shaft that forms the driving shaft, is effected by the simplest means. The axial displacement of the shaft in both directions is preferably effected by a power piston operatively connected with the shaft. The driving pinion of the shears, and the toothed wheel meshing therewith arranged upon the eccentric shaft, are helically toothed, in such a way that a supplementary thrust is provided, acting in the direction of the guide that faces the breast of the blade.

In a further development of the invention, shears opposite to one another are synchronised with one another by a mechanical coupling member, which may at the same time be the common driving shaft.

One constructional example of the invention is illustrated in the accompanying drawings, in which FIGURE 1 shows an axial section of the shears;
FIGURE 2 a section on the line II—II in FIGURE 1; and
FIGURE 3 a portion of FIGURE 1 in the cutting region and the lower guiding region of the shears.

In the frame 1 of the shears, an eccentric shaft 3, carrying the movable blade-holder 2, is supported in an axially displaceable manner. An eccentric 4 has a bearing surface 5, in the shape of a segment of a sphere, for correspondingly constructed bearing pieces 6 on the blade-holder. Guiding surfaces for the blade-holder, namely a guiding surface 8, facing the breast 7 of the blade, and a guiding surface 10, facing the back 9 of the blade, are stationarily secured to the frame 1 of the shears. A guide plate 11, on the blade-holder, facing the blade back 9 is arranged underneath the cutting edge 12 of the blade 13. Upon displacement of the eccentric shaft 4 in the direction of the arrow 14 by a power piston 15, the blade-holder 2 executes a tilting movement (FIGURE 3) around the edge 116 of the guide plate 11, so that the cutting edge 12 of the blade 13 moves away from the cutting plane 17, and therefore moves away from the cut edge of the plate. The tilting movement is so controlled that after the cut has been completed, and during the return stroke of the blade-holder, the latter, by displacement of the eccentric shaft in the direction of the arrow 14, is brought, with its blade, out of the cutting plane, and, upon the initiation of the cutting stroke, by a displacement of the eccentric shaft in the direction opposite to that of the arrow 14, is brought back into the cutting position. The springing pressure acting upon the blade breast 7 during the cutting exerts upon the blade-holder a turning moment in the direction of the arrow 14. This is taken up firstly by the power piston 15, and secondly by the inclined toothing of toothed wheels 18 and 19, the inclined teeth being so constructed as to give rise to a thrust acting in a direction opposite to that of the arrow 14.

Blade-holder guides 20, which extend transversely to the cutting plane, and which are arranged in the region of the blade, have a convex curvature, as shown in FIGURE 2, and are in sliding connection with an intermediate guiding member 21, one guiding surface of which is shaped to fit the convex curvature of the guide 20, whilst its other guiding surface is plane, and slides along a guiding surface 22, stationarily arranged on the frame 1, with the up-and-down movement of the blade-holder. Owing to the convex guiding surfaces, in conjunction with the eccentric suspension of the blade-holder, the latter executes a rocking cutting movement.

The frame 1 is provided, for axial displacement, with guiding shoes 23, which slide upon rails 24.

In order that shears located opposite to one another may run synchronously, they are jointly driven by a splined shaft 25, coupled to a driving engine, not shown.

The torque is obained by a toothed wheel 26 from a toothed wheel 27, keyed to the shaft 25.

We claim:

1. Shears for trimming the edges of thick and medium metal plates, comprising: a stand, a lower blade fixedly mounted in the stand, a movable blade-holder mounted in the stand and adapted to be reciprocated for executing the cut, and a movable upper blade carried by the movable blade-holder, the movable blade-holder being rockable about an axis parallel to the cutting edge of the movable blade, this axis being at a level not higher than the level of the cutting edge of the movable blade, so as to bring the cutting edge of the movable blade out of the cutting plane during the return stroke.

2. Shears as claimed in claim 1, further comprising guiding surfaces stationarily mounted on the stand for guiding the front and rear faces of the movable bladeholder.

3. Shears as claimed in claim 2, further comprising a guide plate mounted in the rear face of the movable blade-holder facing one of the said guiding surfaces, this guide plate extending below the level of the cutting edge of the movable blade.

4. Shears as claimed in claim 3, the upper edge of the said guide plate forming the axis of oscillation of the movable blade-holder.

5. Shears as claimed in claim 1, further comprising an axially displaceable driving shaft guided in the movable blade-holder, the rocking movement of the movable blade-holder being effected by axial displacement of the said driving shaft.

6. Shears as claimed in claim 5, further comprising a power piston operatively connected with the driving shaft for axially displacing the said shaft.

7. Shears as claimed in claim 1, further comprising: an eccentric shaft in which the blade-holder is guided, lateral guides on the movable blade-holder, extending perpendicularly to the plane of cutting and having external convex surfaces in the neighbourhood of the ends of the movable blade, and lateral guide members in the frame, with concave surfaces engaging the concave surfaces of the lateral guides on the movable blade-holder.

8. Shears as claimed in claim 7, further comprising: a helically toothed wheel mounted upon the eccentric shaft, and a helically toothed driving pinion meshing with the said toothed wheel, the form of the helical teeth of the said wheel and pinion being such as to give rise to an axial thrust towards the blade-holder.

9. Shears as claimed in claim 1, further comprising: an eccentric shaft mounted in the frame, an eccentric sheave mounted fast on the eccentric shaft for reciprocating the movable blade-holder, bearing surfaces in the movable blade-holder engaging the peripheral surface of the eccentric sheave, the said peripheral and bearing surfaces being of spherical curvature.

10. Shears as claimed in claim 1 located opposite to one another, comprising a mechanical coupling member coupling the opposite shears to one another to ensure synchronous running thereof.

No references cited.

WILLIAM W. DYER, Jr., *Primary Examiner.*

L. B. TAYLOR, *Assistant Examiner.*